United States Patent [19]
Wyatt

[11] Patent Number: 6,003,687
[45] Date of Patent: Dec. 21, 1999

[54] COMPACT DISC STORAGE RACK

[76] Inventor: Duance C. Wyatt, 275 Weeping Willow Way, Tyrone, Ga. 30290

[21] Appl. No.: 09/103,113

[22] Filed: Jun. 23, 1998

Related U.S. Application Data

[63] Continuation-in-part of application No. 08/805,284, Feb. 25, 1997, Pat. No. 5,769,244.

[51] Int. Cl.$^6$ ...................................................... A47F 7/00
[52] U.S. Cl. ..................... 211/40; 211/41.12; 211/88.01; 211/89.01; D6/407
[58] Field of Search ................................. 211/40, 41.12, 211/88.01, 85.26, 89.01; 312/9.9; 206/308.1; 40/124, 124.2, 124.4; D6/407

[56] References Cited

U.S. PATENT DOCUMENTS

| | | | |
|---|---|---|---|
| 3,200,957 | 8/1965 | Morin | 211/1 |
| 4,684,030 | 8/1987 | Gurzynski | 211/88 |
| 4,867,306 | 9/1989 | Factor | 206/309 |
| 4,919,287 | 4/1990 | Haskett et al. | 211/41 |
| 4,940,147 | 7/1990 | Hunt | 211/40 |
| 4,951,826 | 8/1990 | Tompkins | 211/40 |
| 5,040,687 | 8/1991 | Whittington | 211/40 |
| 5,052,564 | 10/1991 | Zuzack | 211/40 |
| 5,072,836 | 12/1991 | Gross | 211/40 |
| 5,078,270 | 1/1992 | Campbell | 204/444 |
| 5,105,952 | 4/1992 | Krattiger | 211/41 |
| 5,172,817 | 12/1992 | Gross | 211/40 |
| 5,232,089 | 8/1993 | Kim | 206/309 |
| 5,341,942 | 8/1994 | James, Jr. | 211/40 |
| 5,351,835 | 10/1994 | Hallgren | 211/40 |
| 5,372,263 | 12/1994 | Niekel | 211/41 |
| 5,485,926 | 1/1996 | Kundert | 211/40 |
| 5,495,953 | 3/1996 | Bearth | 211/40 |
| 5,497,889 | 3/1996 | Genovesi | 211/40 |
| 5,518,125 | 5/1996 | Colosimo | 211/40 |
| 5,603,415 | 2/1997 | Balnis | 211/40 |
| 5,622,270 | 4/1997 | Bezos | 211/40 |
| 5,706,955 | 1/1998 | Andersson | 211/40 |
| 5,769,244 | 6/1998 | Wyatt | 211/40 |

OTHER PUBLICATIONS

Home Decorators Collection, p. 70–73, Winter 1996, (catalog).

*Primary Examiner*—Robert W. Gibson, Jr.
*Attorney, Agent, or Firm*—Kennedy, Davis & Hodge

[57] ABSTRACT

A rack for the storage and display of compact disc cases includes a grid of horizontal and vertical bars to form a plurality of cells each sized to receive a compact disc case for display. A lip extending laterally from a vertical bar of each cell which defines a recess in the cells for receiving edge portions of compact disc cases. A spring is mounted to the grid within each of the cells for biasing the compact disc case placed therein against the lip.

4 Claims, 6 Drawing Sheets

COMPACT DISC STORAGE RACK

REFERENCE TO RELATED APPLICATION

This is a continuation-in-part of application Ser. No. 08/805,284 filed Feb. 25, 1997, now U.S. Pat. No. 5,769,244.

TECHNICAL FIELD

The present invention relates to apparatus for storing compact disc cases. More particularly, the present invention relates to display apparatus for compact disc cases, which provides secure retention of compact disc cases during display while facilitating removal of a selected compact disc case therefrom.

BACKGROUND OF THE INVENTION

Compact discs are circular, flat plastic discs on which information is recorded. The information can be interpreted by compact disc players as audio, video, or text. Compact discs are commonly used to distribute music, computer software, and research information. Compact discs sold to consumers are typically contained in a standardized type of storage case. These types of storage cases include cardboard envelopes, plastic jackets with pockets for receiving discs, and plastic boxes or cases. For example, computer software is typically provided in an envelope or jacket. On the other hand, in the fields of music, computer research materials, and computer games, compact disc recordings are often contained in plastic boxes (or cases) having a hinge along one side. Such cases are generally referred to as jewel box-style compact disc cases. The jewel box compact disc case opens along a hinge to reveal a compact disc held within a molded internal frame. The case may be characterized as a clam-shell case. The case has a front cover side, and an opposing back side that is parallel with the front cover side. The front side and the back side pivotally connect on the hinge side or "spine." Compact disc cases often contain an ornamental front display insert which is used to identify the performing artist, musical group, or research material which is recorded on the compact disc. The front display insert is secured within the disc case. The jewel box case also often includes a short descriptive title of the compact disc recording along its spine and front edge. For compact disc sets of two or more compact discs, the jewel box-type case typically includes "page" portions that are pivotally moveable about the spine.

There are various devices used for storing collections of compact discs. One device provides an envelope with pockets for receiving the discs. However, many people prefer to store the discs within the jewel box. Often the jewel boxes are placed side-by-side in a book case or storage rack. The jewel boxes are preferably oriented with the spine outward for use in selecting discs.

Often persons store jewel box cases in slotted-style, tower-type racks. The tower-type racks typically have narrow columns with slotted receptacles for receiving the jewel box cases. These compact disc towers dispose the compact disc cases either in a vertical side-by-side arrangement or in a horizontal top-to-bottom arrangement. The cases are preferably inserted so that the side text on the spine side may be visible. While such storage allows for efficient use of space, selection of a particular compact disc is often difficult. Because the text on the spine of compact disc cases is small, the titles are often difficult to read. A user also has to bend his head into a cocked position in order to read the vertical spines of the cases, or may have to stoop to read the horizontal spines of the cases. Furthermore, while the storage of discs in a tower or shelf is an efficient use of space, it prevents the viewing of the artistic cover which often adorns the front cover side of compact disc cases. Also, extraction of a compact disc case from towers or stacks requires grasping the lateral sides of the disc and pulling outwardly. This often is cumbersome due to the close spacing of the compact disc cases in the tower.

Storage racks have been developed which allow for the display of jewel-box compact disc front cover sides. Such racks allow for quick selection of a compact disc case by recognition of a cover design. Furthermore, such display racks serve an aesthetic purpose by providing wall ornamentation. However, such racks often require two hands to manipulate the compact disc case in and out of the rack. Also, some such display racks do not provide for the storage of multi-disc sets. Furthermore, such racks often utilize complex mechanisms or shelves to hold the disc cases on the rack, or require alteration of the compact disc cases themselves to allow for storage of a disc case within the rack. In one type of these shelf racks, if it is accidentally jarred, the jewel boxes fall from the rack.

Furthermore, some compact discs in the field of computer research materials and software are sold in jewel box style cases. Such computer research material discs are usually packaged with supporting literature in boxes many times the size of the compact discs contained therein. Storage of computer discs in such boxes is impractical given the limited space usually present adjacent to a computer drive for reading compact discs. Storage of computer discs in a compact disc storage tower is also impractical, since the jewel boxes containing such discs often lack sufficient identifying language along their spine to readily ascertain their contents. While such computer discs could be stored in a floppy-disc type holder, such storage requires a user to flip through a series of titles before accessing the needed disc.

Accordingly, there is a need in the art for a storage rack which provides secure retention of compact disc cases with display of front covers for aiding selection of discs while the storage rack facilitates access and removal of selected cases of discs.

SUMMARY OF THE INVENTION

The present invention meets a need in the art by providing a rack for storage and display of jewel box compact disc cases while facilitating selection and removal of cases from the rack. The storage rack includes a plurality of horizontal and vertical bars mounted to each other to form a grid that bounds a plurality of cells. Each cell is sized to receive a jewel box compact disc case for display. Retention means is each cell hold an edge portion of a compact disc disposed therein. A spring is mounted to the grid within each cell for securing a compact disc case against the retention means.

DETAILED DESCRIPTION OF THE PREFERRED EMBODIMENTS

Figure 1:
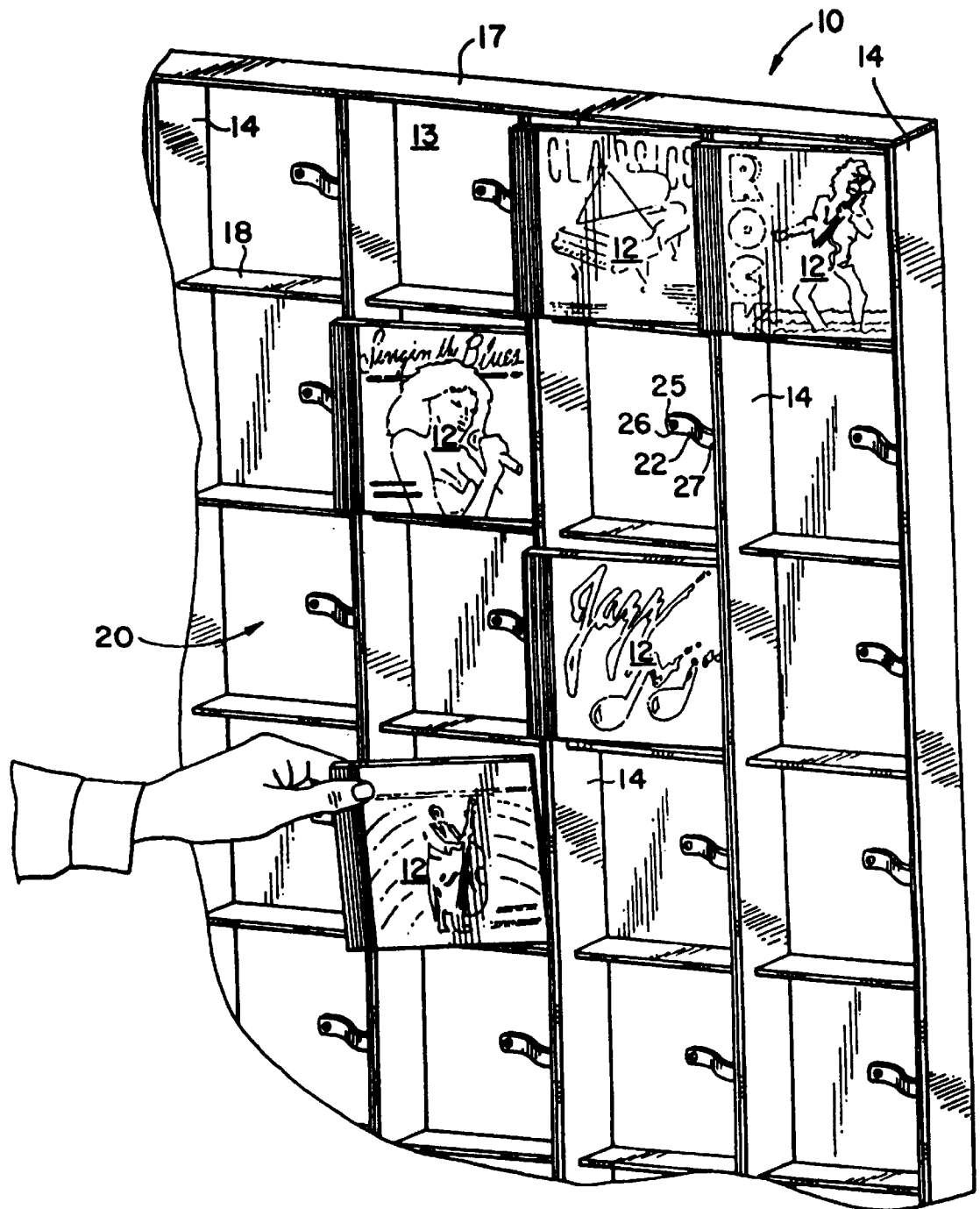
FIG. 1 is a fractional perspective view of a compact disc case storage and display rack that embodies the present invention in a preferred form.

Referring now in more detail to the drawings, in which like numerals indicate like parts throughout the several views, FIG. 1 illustrates a fractional perspective view of a rack 10 for storing and displaying a plurality of compact disc cases 12, according to the present invention. The rack 10 includes a backboard 13 from which a plurality of spaced apart vertical bars 14 and horizontal bars 18 extend laterally. The term "vertical" refers to normal up and down spatial relations as viewed in a direction towards the rack 10 in FIG. 1. The term "horizontal" refers to left and right as viewed in FIG. 1. The vertical bars 14 extend between the top and the bottom of the rack 10. In the illustrated embodiment, the bars 14 and 18 are narrow elongate strips of a rigid material attached to the backboard 13 with glue, nails, or other fasteners. A pair of elongate members 17 defines a top and a bottom (not illustrated) for the rack 10.

The horizontal bars 18 are secured in spaced-apart relation between adjacent pairs of the vertical bars 14. The vertical bars 14 and the horizontal bars 18 cooperate to define a grid of a plurality of cells 20 in the rack 10. The spacing between the bars is sized so that each cell 20 accommodates a conventional jewel box style compact disc case 12. The individual cells preferably have a dimension of 5.25 inches in height by 5 inches in width by 1.5 inches in depth to accommodate a conventional jewel box type compact disc case as well as multiple-disc compact disc cases. The conventional single disc jewel box type computer disc case is approximately 4.875 inches in height by 5.5 inches in width by 0.375 inches in depth. While the height of each cell can exceed 5.25 inches, the width and depth of each cell should approximate the preferred measurements for sufficient visual display of compact disc case covers. It is appreciated that if the width of the cells 20 is significantly narrower, more compact disc cases are able to be stored in the rack but the view of the front covers is diminished.

Figure 2:
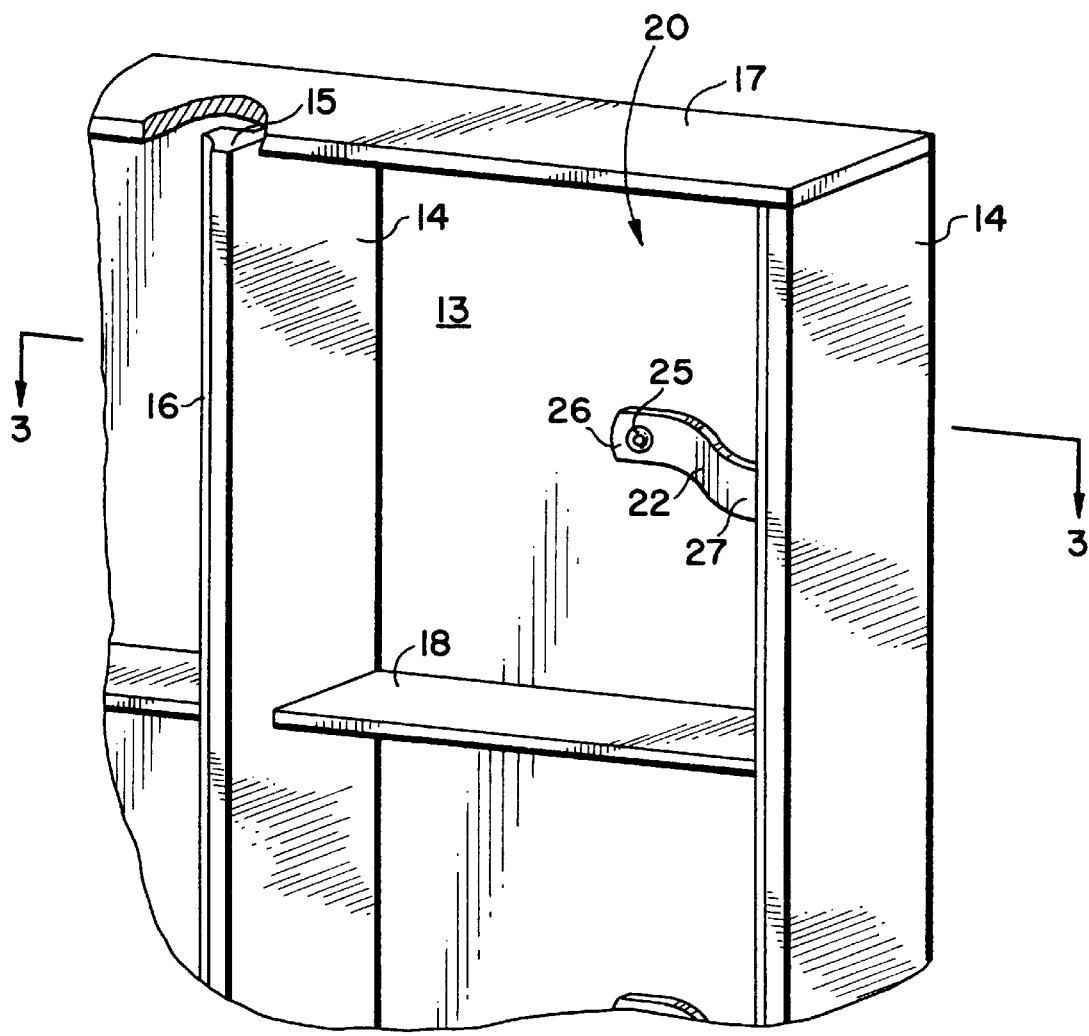
FIG. 2 is a fractional perspective view of the compact disc rack of FIG. 1.
Figure 3:
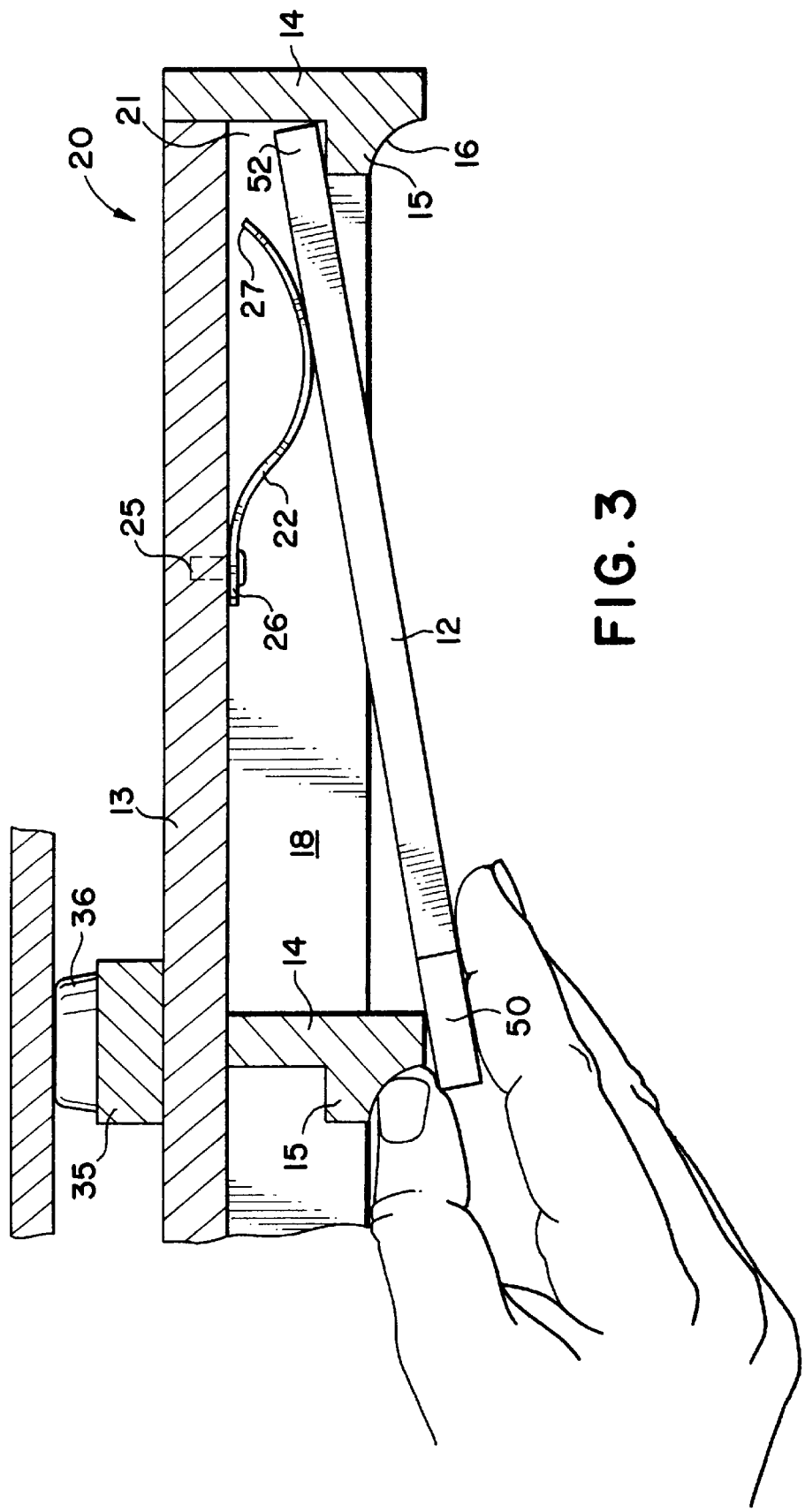
FIG. 3 is a cross-sectional view of the compact disc rack of FIG. 2 with a compact disc case of the jewel box type being removed from the rack taken along line 3—3 of FIG. 2.

FIG. 2 is a fractional perspective view of the rack 10 and FIG. 3 is a cross-sectional view of the rack taken along lines 3—3 of FIG. 2, which illustrates features of the rack. Each of the vertical bars 14 has a distal end from which a lip 15 projects laterally over the cell 20. The lip 15 preferably includes a flared concave indentation 16 along the length of the vertical member 14, for a purpose discussed below. The lip 15, the vertical bar 14, and the backboard 13, cooperatively define a recess 21 in a side portion of the cells 20. It is preferred that the depth of the recess 21 be two-to-three times the width of the compact disc case to be held within the cell 20. A spring 22 mounts within each cell 20 to the backboard 13 by a fastener 25. In the illustrated embodiment, the spring 22 is an arcuate leaf spring mounted at a first end 26 by the fastener 25, such as a screw or rivet, and having a distal free end 27. As best illustrated in FIG. 3, the spring 22 is positioned in the cell such that the distal free end 27 is oriented towards the recess 21, whereby the spring 22 contacts the planar back wall of the compact disc case 12 inserted into the cell 20, as discussed below. Preferably, the spring 22 is a leaf spring, but in the alternative, it may be a coiled spring positioned on the backboard 13 so as to apply pressure on the disc case 12 positioned in the cell 20, as discussed below.

The storage rack 10 mounts to a wall by conventional fasteners (not shown). In the illustrated embodiment, mounting blocks 35 attach to the back of backboard 13. A pad 36 buffers the connection of the rack to the wall. A fastener (not illustrated) extends through the mounting blocks 35 to secure the rack to a wall.

The compact disc storage rack 10 may be made of a variety of materials, such as wood or plastic. The rack may be mounted to a wall via fasteners (not shown) or may be attached to a base (not shown) for standing on a horizontal surface such as a floor. The compact disc storage rack 10 may include a number of cells depending upon the overall size of the rack. It may be built into a piece of furniture, such as an entertainment center or computer desk.

With reference to FIGS. 1 and 3, the rack 10 is operated to store and display a plurality of compact disc cases 12, each held within one of the cells 20. The disc cases 12 slidingly insert laterally into the selected cells 20. This is accomplished by holding the disc case 12 along its spine edge 50 and angularly inserting the opposite edge 52 into the selected one of the cells 20. The back planar surface of the disc case 12 contacts the spring 22, and with light pressure, the disc case is then pushed laterally to position the edge 52 within the recess 21. The front face of the disc case 12 bears against an inner surface of the lip 15. The back spine portion 50 of the disc case 12 is disposed outwardly of the cell 20 and a portion of the back of the disc case 12 bears against a front edge of the lip 15. In this manner, the disc case 12 is positioned at a shallow acute angle relative to the backboard 13. The spring 22 bears against the disc case 12 and maintains the disc in the recess 21. The front cover portion of the disc case 12 is thereby visible in the rack 10. The remaining cells 20 are similarly filled with compact disc cases.

The rack 10 facilitates ready removal of a selected compact disc case 12 from the rack. Selection of the disc is readily accomplished by observing the covers of the disc cases 12 stored and displayed in the rack 10. A compact disc case 12 is selected for removal. The selected compact disc case is grasped adjacent the spine edge 50. The thumb or forefinger of the person using the rack 10 is conformingly received in the channel 16 with the forefinger or thumb positioned on the front cover of the disc case 12. The compact disc case 12 is then slidingly removed from engagement with the spring 22 and the lip 15 in order to release the disc case 12 from the cell 20.

Figure 4:
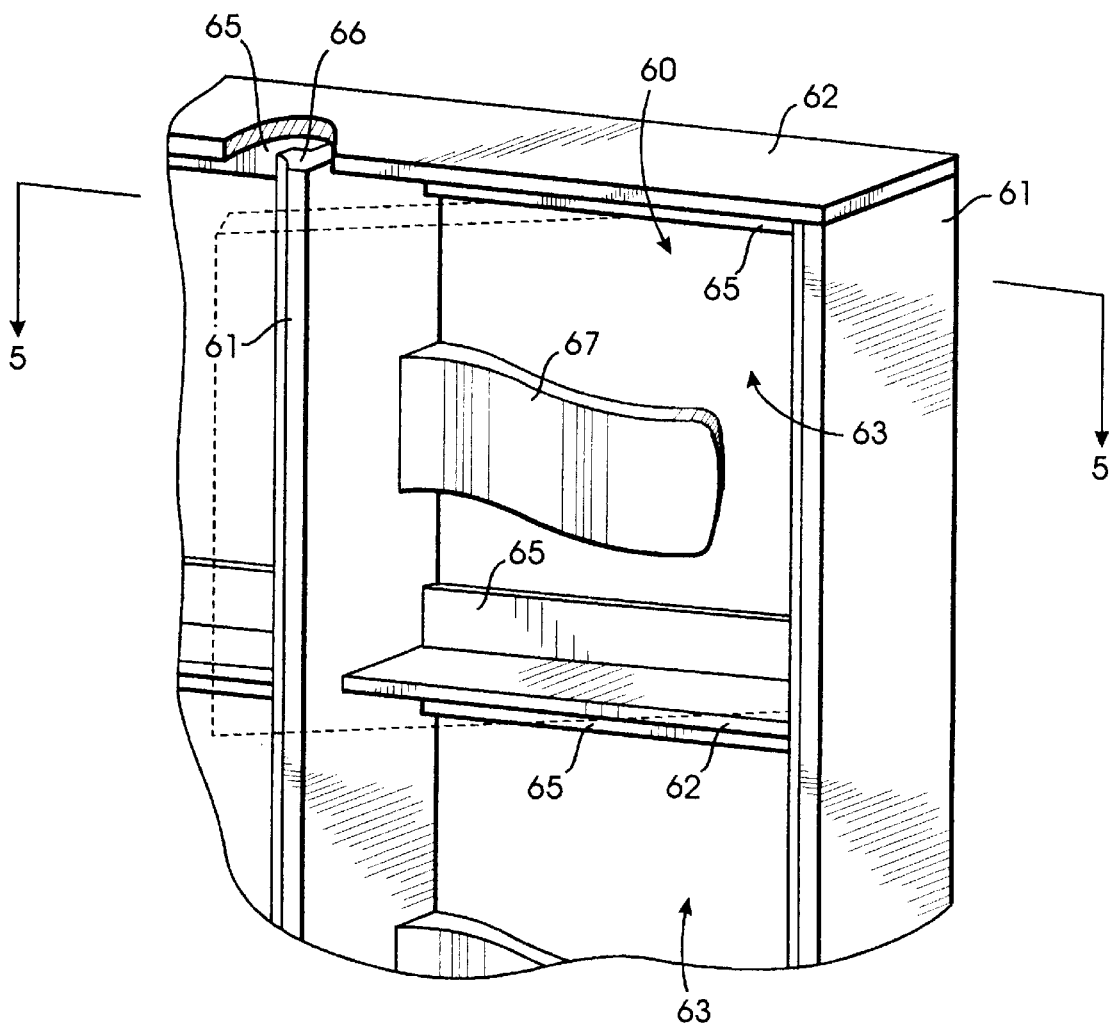
FIG. 4 is a fractional perspective view of a compact disc case storage and display rack in another preferred form.
Figure 5:
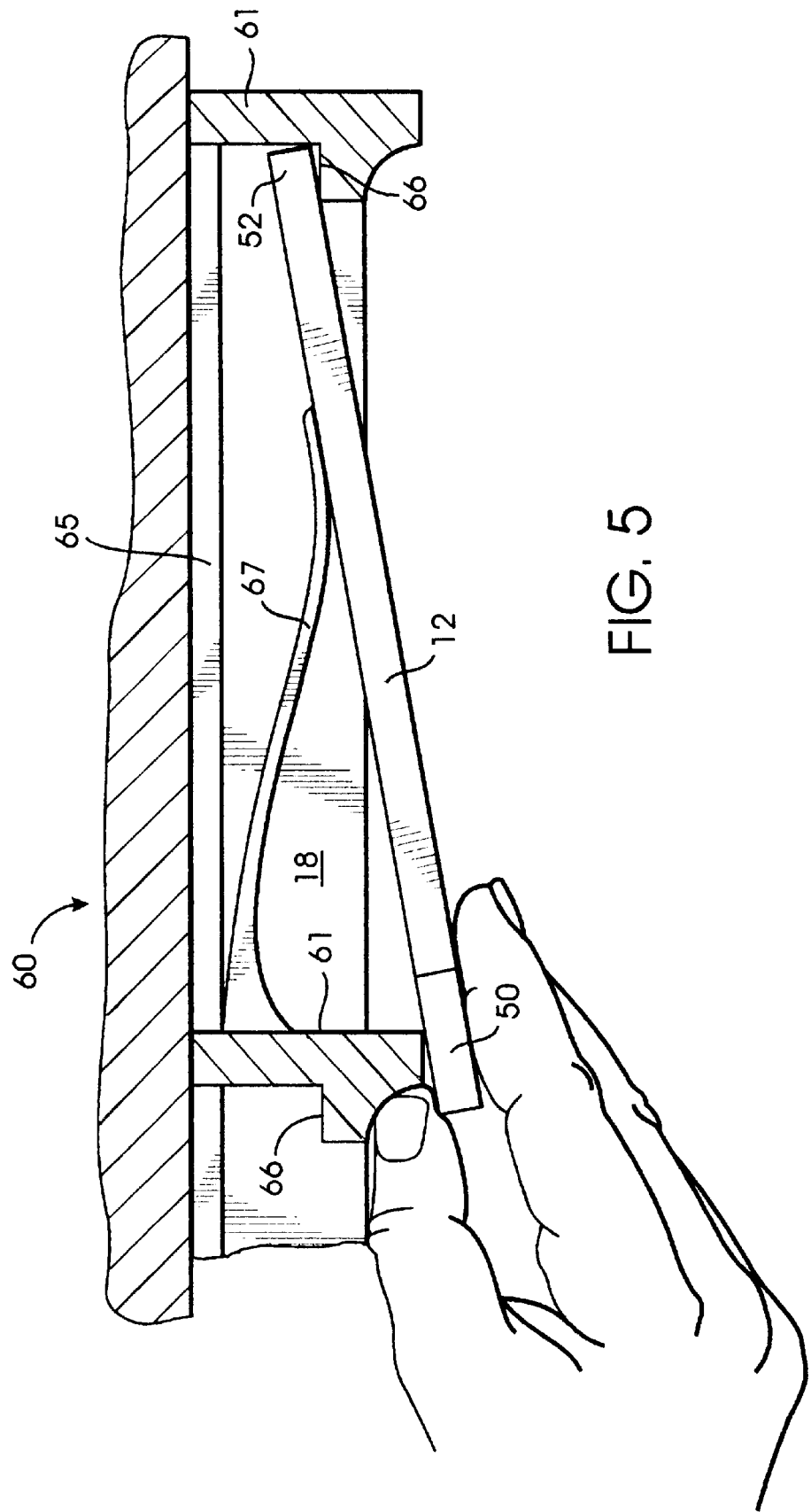
FIG. 5 is a cross-section view of the compact disc rack of FIG. 4 with a compact disc case of the jewel box type being removed from the rack taken along line 5—5 of FIG. 4.

With reference next to FIGS. 4 and 5, there is shown a rack 60 in another preferred form. Here, the rack 60 is similar to that shown with reference to rack 10 except for the form of the backboard and spring. Rack 60 has a grid of spaced apart vertical bars 61 and horizontal bars 62 which define a matrix of cells 63. The horizontal bars 62 have rails or flanges 65 extending perpendicularly from the rearmost portion. Each cell has a vertical bar with a lip 66 and a spring 67 extending from the vertical bar opposite the lip.

The rack 60 is mounted directly to an upright wall, such as structural wall of a home or that of existing furniture in any conventional manner such as with unshown screws. As such, the rack may be mounted to the inside door of an entertainment center to maximize storage space therein.

The use of the rack is similar to that previously described with the spring 67 forcing the compact disc case against the lip 15 so as to hold the disc case therebetween. The disc case may bear upon flanges 65 as it is inserted within the cell.

Figure 6:
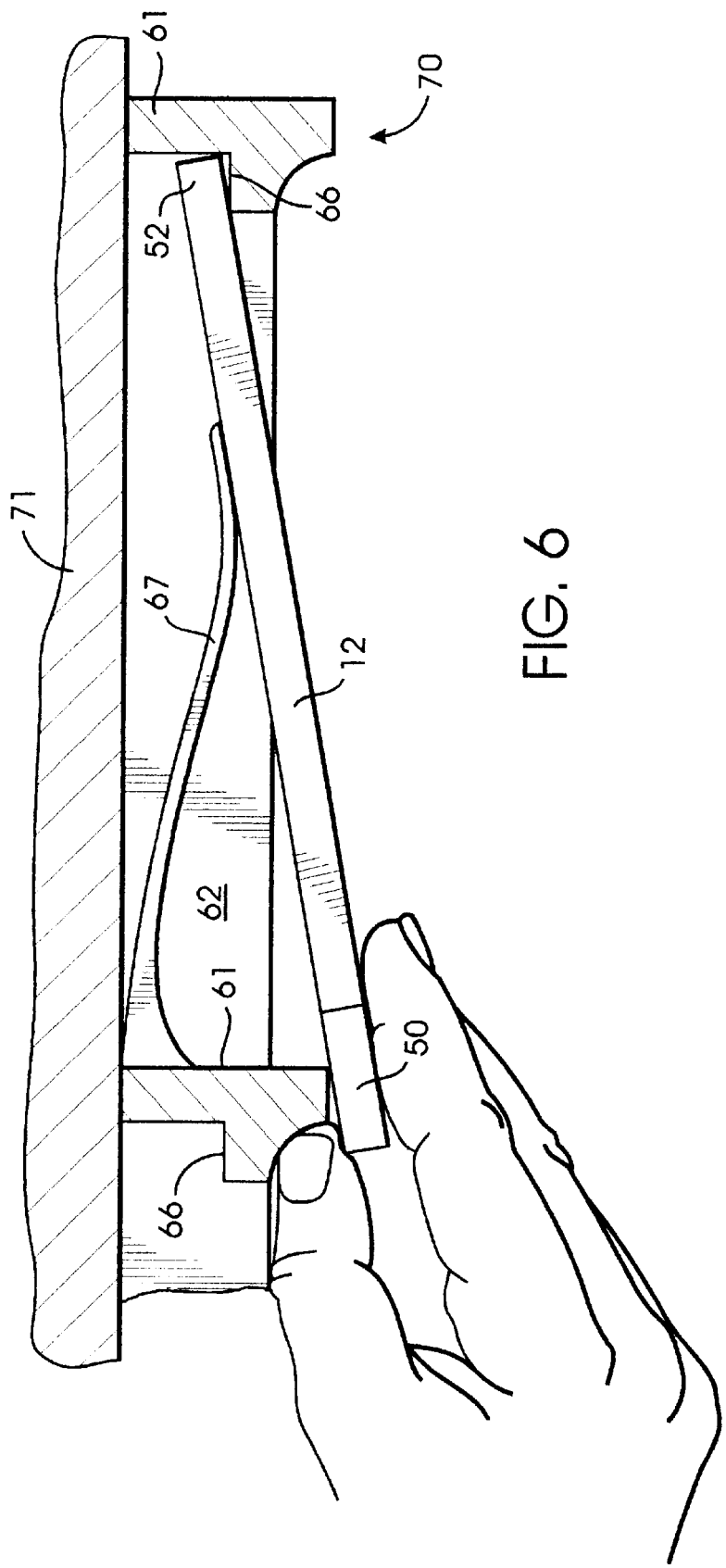
FIG. 6 is a cross-section view of a compact disc rack in yet another preferred form.

Referring next to FIG. 6, there is shown a rack 70 in another preferred form. Here, the rack 70 is similar to that shown with reference to rack 60 except for the absence of the rails or flanges 65. As such, the disc may bear upon the underlying furniture or structural supporting wall 71 to which the rack is mounted as the disc in inserted within the cell.

This rack reduces the quantity of materials used to comprise the rack as the back is totally absent. This results in the reduction of costs associated with the manufacturing of the rack and the reduction of the overall weight of the finished rack.

The present specification accordingly discloses the storage rack that provides secure storage of compact disc cases in an ornamental fashion, while yet facilitating easy selection and removal of the disc case for use of the disc therein. While this invention has been described in detail with particular references to the preferred embodiments thereof, it should be understood that many modifications, additions and deletions may be made thereto without departure from the spirit and scope of the invention as set forth in the following claims.

I claim:

1. A rack for the storage and display of compact disc cases comprising a plurality of horizontal bars and a plurality of vertical bars mounted to each other to form a grid defining a plurality of cells, each of said cells sized to receive a compact disc case for display, retention means in each cell for holding an edge portion of a compact disc disposed therein, spring means mounted to said grid within each one of said cells and oriented towards said retention means for securing a compact disc case against the retention means, said retention means has a lip on each of said vertical bars extending laterally over a portion of said cells to define an interior surface within each of said cells portion for stopping a compact disc case within one of said cells portion from sliding out of said cell, and wherein said lip includes a flared concave elongated portion on an exterior surface along the length of said vertical bar for assisting in removal of a compact disc case from a storage position between said spring means and said lip.

2. A rack for the storage and display of compact disc cases comprising a plurality of horizontal bars and a plurality of vertical bars mounted to each other to form a grid defining a plurality of cells, each of said cells sized to receive a compact disc case for display, retention means in each cell for holding an edge portion of a compact disc disposed therein, spring means mounted to said grid within each one of said cells and oriented towards said retention means for securing a compact disc case against the retention means, and at least one rear rail extending across a rear portion of said cells.

3. A case storage and display rack for the storage and display of cases adapted for holding removable discs of recorded information, said case having side portions of a predetermined height, width, and depth, comprising:

at least one rear rail having a front side and a rear side;

a top ledge projecting laterally with respect to said front side;

a bottom ledge projecting laterally with respect to said front side, said bottom ledge being parallel to said top ledge and being spaced a distance from said top ledge at least slightly greater than a predetermined height of a case to be received by the rack, said bottom ledge having a depth greater than a depth of said case;

a first side member extending between said top ledge and said bottom ledge, a second side member extending between said top ledge and said bottom ledge, said second side member being parallel to said first side member and including a lip extending laterally toward said first side member, said lip and said rear rail cooperatively defining a recess for receiving an edge portion of a compact disc case;

biasing means mounted to said first side member for biasing a side portion of said case within said recess against said lip, whereby said case being slidingly inserted into the compact disc rack, is held in place between the biasing means and the lip.

4. A rack for storing and displaying a plurality of compact disc cases, comprising:

a plurality of spaced-apart elongated vertical members disposed parallel to each other;

a plurality of spaced-apart, horizontal cross-members, each disposed between respective adjacent pairs of said vertical members, thereby defining a plurality of cells, the spacing of adjacent vertical members and of adjacent horizontal cross-members sufficient for receiving within each said cells at least one compact disc case;

said vertical members each having a lip on an outer distal edge which extends laterally to define a recess within a portion of said cells defined by the vertical member;

a spring mounted in each of said cells; and a plurality of rear rails, each said rear rail being disposed within one said cell to define a rear portion of said cell, whereby a compact disc case, being received within one of the cells is secured therein with an edge portion of the case received in the recess and the spring bearing forcibly against the compact disc case to secure the case within the cell.

* * * * *